United States Patent [19]

Geller

[11] Patent Number: 4,876,470
[45] Date of Patent: Oct. 24, 1989

[54] GAS-COOLED ELECTRIC MACHINE

[75] Inventor: Marius Geller, Fislisbach, Switzerland

[73] Assignee: BBC Brown Boveri AG, Baden, Switzerland

[21] Appl. No.: 144,046

[22] Filed: Jan. 14, 1988

[30] Foreign Application Priority Data

Feb. 6, 1987 [DE] Fed. Rep. of Germany ....... 3703594

[51] Int. Cl.$^4$ ................................................ H02K 9/00
[52] U.S. Cl. ........................................ 310/59; 310/55; 310/63; 310/64
[58] Field of Search ................. 310/52, 55, 57, 58, 310/59, 61, 62, 63, 64, 65, 89, 154, 161

[56] References Cited

U.S. PATENT DOCUMENTS

| | | | |
|---|---|---|---|
| 2,324,297 | 7/1943 | Grobel | 310/57 |
| 3,505,546 | 4/1970 | Victor | 310/57 |
| 3,571,635 | 3/1971 | Turner | 310/59 |
| 3,652,881 | 3/1972 | Albright | 310/57 |
| 3,714,478 | 1/1973 | De Mania | 310/57 |
| 4,246,503 | 1/1981 | Fujioka | 310/59 |

FOREIGN PATENT DOCUMENTS

| | | |
|---|---|---|
| 0074293 | 7/1970 | . |
| 0172397 | 2/1986 | European Pat. Off. . |
| 1949939 | 4/1970 | Fed. Rep. of Germany . |
| 2252733 | 7/1973 | Fed. Rep. of Germany . |
| 2309003 | 9/1973 | Fed. Rep. of Germany . |
| 2145748 | 12/1977 | Fed. Rep. of Germany . |
| 2724421 | 12/1977 | Fed. Rep. of Germany . |
| 3444189 | 9/1985 | Fed. Rep. of Germany . |
| 2111287 | 6/1972 | France . |
| 0607421 | 12/1978 | Switzerland . |

*Primary Examiner*—R. Skudy
*Attorney, Agent, or Firm*—Oblon, Spivak, McClelland, Maier & Neustadt

[57] ABSTRACT

In a gas-cooled electric machine the cooling-gas supply and removal in the cavity between the laminated stator body and housing is arranged so that the heated cooling gases from the central section of the machine are supplied through separate cooling-gas lines to the ends of the machine and, consequently, to the coolers. In this manner, the individual volumetric flows through the individual zones (I, II, III) of the machine can be partitioned so that an equalization of the temperature level in the longitudinal direction of the machine is achieved.

7 Claims, 5 Drawing Sheets

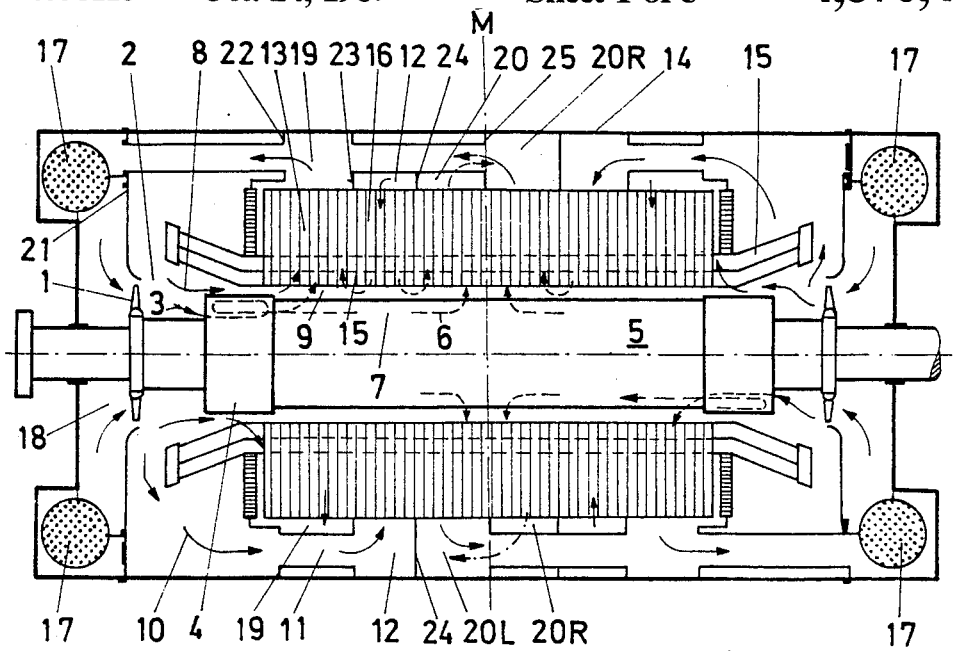
Fig.1 PRIOR ART
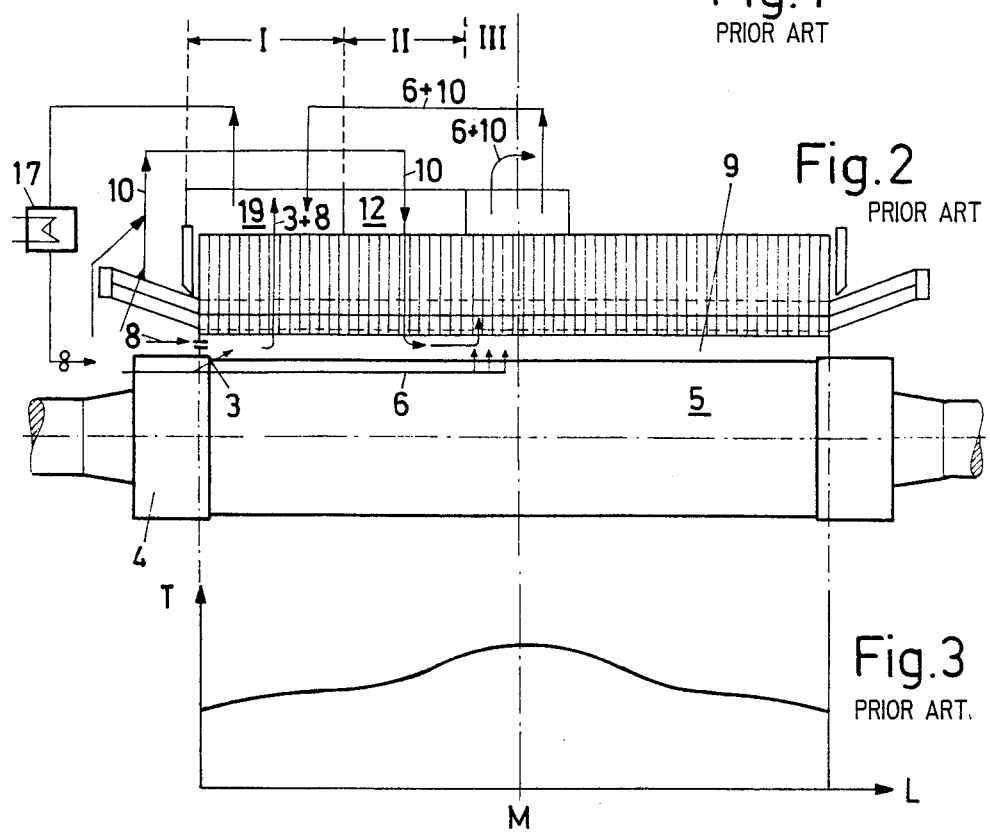
Fig.2 PRIOR ART
Fig.3 PRIOR ART gas-cooled electric machine

BACKGROUND OF THE INVENTION

1. Field of the Invention

The invention relates to an electric machine having a housing, a stator, disposed in said housing, with indirectly cooled stator winding conductors disposed in grooves on the inside circumference, and a rotor, the laminated body of the stator being constructed of individual laminated subassemblies spaced from each other by spacing bridges and the intermediate cavities between two successive laminated subassemblies forming radially extending cooling slits, and the cooling slits connecting annular air-gap cavities at the inside circumference of the laminated stator assembly to chambers which are situated between the outside circumference of the laminated stator body and the housing and which chambers comprise cold-gas chambers, from which cold cooling gas is forced into associated first air-gap cavities, and comprise hot-gas chambers into which heated cooling gas flows from second air-gap cavities in a radially outwards direction, there being provided at least at one end of the machine, preferably at both ends of the machine, cooling-gas impellors and cooling-gas guidance devices which supply the cooling gas, cooled by heat exchangers, as cold gas to the cold-gas chambers and extract the heated cooling gas from the hot-gas chambers again.

A gas-cooled electric machine with these features is known, for example, from the European Patent Application No. 0172397 or from the German Offenlegungsschrift No. 3,444,189.

2. Description of the Prior Art

The principle of the so-called indirect cooling system is to transfer the losses produced in the stator winding rods to the cooling medium (hydrogen or air). The main heat flow takes place under these circumstances from the rod copper via the insulation to the tooth region of the laminated stator body. From the stator teeth, the heat is transferred to the cooling medium.

The limits imposed on the heating up are fixed under these circumstances by the temperature sensitivity of the insulation and, in addition, by appropriate maximum temperatures which are laid down in national and international standards by various insulation categories.

As a consequence of the relatively large temperature difference between the stator copper embedded in the insulation and the outside layer of the insulation, the maximum output of an indirectly gas-cooled turbo generator is limited by a classical cooling principle.

There has therefore been no lack of proposals for improving the cooling, these efforts being concentrated mainly on intensifying the cooling in the central region of the machine.

Thus, the European patent application mentioned in the introduction describes a gas-cooled electric machine in which cooling gas is supplied and removed through cooling slits combined in groups. In one group, cold cooling gas flows from the core back to the air gap of the machine, while in the other group, heated cooling gas flows from the air gap of the machine to the stator back. In order to prevent an application of already heated cooling gas to the winding conductors, the winding conductors are partitioned off in the cooling slits of the second group and are cooled by axial channels in the tooth head which are open with respect to the winding conductors and through which fresh gas flows. This makes a substantial equalization of the temperature level in the longitudinal direction of the active section possible.

In the case of the gas-cooled machine known from the German Offenlegungsschrift No. 3,444,189, to improve the heat transfer and utilize the cooling-gas flow, the teeth of the laminated stator body are provided with cooling channels in the teeth, which channels are in communication with radial cooling-gas slits, and in particular, cold-gas slits and hot-gas slits. In the axial region of the cold-gas chambers, radial/axial cooling paths are formed by varying punchings of laminated layers which are adjacent to each other, the punchings overlapping at least radially. The cooling paths debouch into the air gap of the machine via cooling-gas outlet slits. A cold-gas circuit is superimposed on the laminated subassemblies disposed in the axial region of the hot-gas chambers. For this purpose, axial overflow channels and radial additional slits are provided. The latter are disposed in each case fairly centrally between the radial hot-gas slits and have a smaller axial width than the latter.

Both known measures require comparatively large interventions in the structure and the design of the laminated stator body and are therefore expensive.

SUMMARY OF THE INVENTION

The object of the invention is to provide a gas-cooled electric machine of the generic type described in the introduction which makes possible, virtually without constructional intervention in the tooth region of the laminated stator body, a substantial increase in output of the relatively inexpensive indirectly cooled machines in a field which could hitherto be covered only by more costly and more expensive directly cooled types of machine.

This object is achieved in a gas-cooled electric machine wherein, according to the invention, the hot-gas chamber(s) present in the central section of the machine has (have) available separate cooling-gas lines which, by circumventing the hot-gas chambers at the ends, establish a direct connection between the central hot-gas chambers and the heat exchangers.

In this manner, mixing of the heated cooling gas from the central hot-gas cavities with that from the hot-gas cavities at the ends is prevented. However, what is of far greater importance for the cooling action is the fact that there is now the possibility available for the first time of partitioning the volumetric flow through the individual cooling slits and the air-gap and chamber cavities allotted to them in a manner such that an almost complete equalization of the temperature profile in the longitudinal direction of the machine results.

BRIEF DESCRIPTION OF THE DRAWINGS

The invention is explained in more detail below by reference to exemplary embodiments. In the drawing:

FIG. 1 shows a simplified representation of a gas-cooled electric machine of known construction, FIG. 2 a diagrammatic representation of the cooling-gas distribution of this known machine, FIG. 3 the basic temperature distribution of the stator rods in the longitudinal direction of the machine which results from the known cooling-gas distribution, FIG. 4 the associated tubing in the space between laminated stator bodies and housing jacket.

DESCRIPTION OF THE PREFERRED EMBODIMENTS

Figure 4:
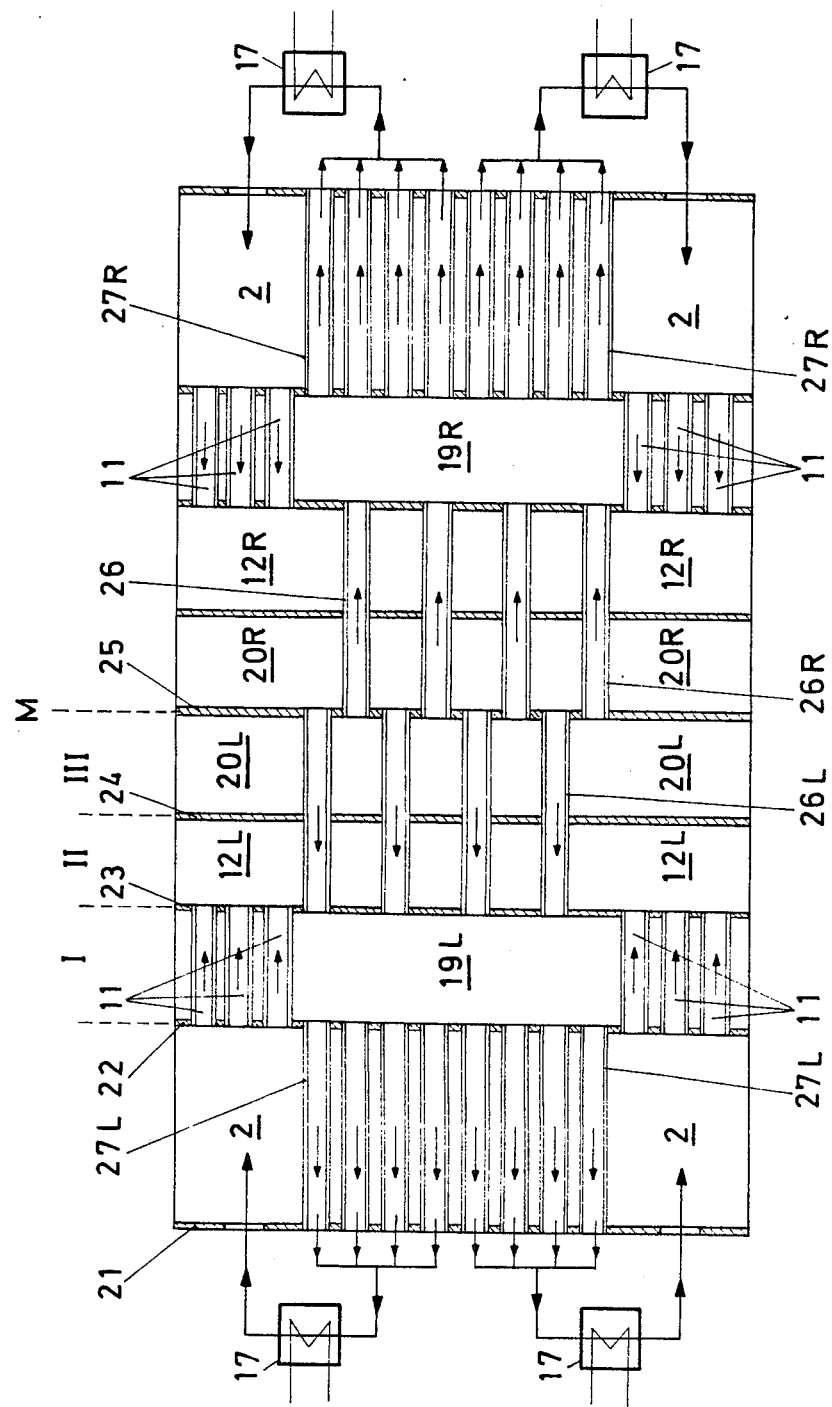

The cooling principle of a hydrogen-cooled turbogenerator is illustrated in FIG. 1. It is only necessary to consider one half of the machine since the generator is symmetrically constructed. In this figure, all the details which are unnecessary for the immediate understanding of the invention have been omitted. A much more comprehensive representation and description of such a machine is found, for example, in the Swiss Patent No. 607,421.

The cooling gas impelled by a main fan 1 divides in the winding head cavity 2 into individual partial volumetric flows which are allocated to the various flow channels in the machine as follows:

a first volumetric flow 3 through the rotor winding head 4 of the rotor 5, a second volumetric flow 6 through the active section 7 of the rotor to the cooling system of the rotor winding (not shown), a third volumetric flow 8 through the air gap 9 in the machine, and a fourth volumetric flow 10 through a cold gas channel 11 into a cold gas chamber 12 in the cavity between laminated stator body 13 and the machine housing 14 which surrounds it.

The cooling of the laminated stator body 13 and, consequently, of the stator winding rods 15 takes place through cooling slits 16 which extend radially and which are formed between individual laminated subassemblies. Said cooling slits 16 are uniformly distributed over the entire active length of the stator and partitioned into three zones for each machine half.

A chamber is allocated to each zone on the back of the stator, as a result of which the allocation of different partial volumetric flows to the different radial cooling slits is established. At the end of its circuit, the heated cooling gas is fed to coolers 17, flows into the intake cavity 18 of the main fan 1 and from there back into the circuit.

The basic cooling-gas distribution in the stator and also the distribution of the partial volumetric flows into the individual chambers are illustrated in FIG. 2, identical parts being provided with the same reference symbols as in FIG. 1.

The partitioning of the laminated stator body into three zones I, II and III for each half of the machine takes place according to the following system:

Zone I cooling-gas supply through the air gap 9 with cold gas (volumetric flow 8) and heated cooling gas from the rotor winding head 4 (volumetric flow 3);

Zone II cooling-gas supply from the back of the stator through the channels 11 and the cold-gas chamber 12 (volumetric flow 10);

Zone III cooling-gas supply via the air gap 9 with gas flow from zone II and heated cooling gas from the rotor 5 (volumetric flow 6 and 10) into a central hot gas chamber 20R or 20L.

In this connection it should be noted that the volumetric flow 6 and 10 from the central hot-gas chamber 20L (zone III) is fed into the cooling-gas circuit of the right-hand half of the machine while that from the right-hand half of the machine is transferred into the circuit of the left-hand half. This crossed cooling-gas distribution of the gas flow from zone III serves to partially mix the gas flows from the left-hand and right-hand half of the machine in order to ensure reliable operation at slightly reduced power in the event of failure or maintenance of one of the four coolers. For the mode of operation of the invention, this measure is not of significance and has only been included in the exemplary case in order to describe the invention with reference to reality.

FIG. 2 clarifies the fact that, owing to the supply of cooling gas which has already been heated up (volumetric flow 6 and 10) a marked temperature maximum of the rods in the centre of the machine M, which limits the maximum exploitation of the generator, is produced in the center of the machine on entry into the zone III. In particular, the hot rotor gas (volumetric flow 6) is responsible for the relatively high temperature of the gas flow (volumetric flow 6 and 10). In the stator rods, a temperature distribution in the longitudinal direction of the machine is established, the basis curve of which is illustrated in FIG. 3 in which the ordinate denotes the temperature T of the stator winding rods and the abscissa denotes the longitudinal direction L of the machine.

FIG. 2 furthermore clarifies the fact that, in the outer hot-gas chamber 19L allocated to the zone I, a mixing of the volumetric flows 6 and 10 from zone III and of the volumetric flows 3 and 8 from zone I results. From the cooling-gas distribution as shown in FIG. 2 it is furthermore evident that an increase in the total volumetric flow, for example by increasing the fan power, cannot contribute essentially to the equalization of the temperature level in the longitudinal direction of the machine since the flow resistances for the volumetric flows 6 and 10 are much higher compared to those of the volumetric flows 3 and 8. Even an increase in pressure in the circuit does not result in the required objective since the pressure difference in the zones I and III cannot be reduced in this manner.

The manner and means of practically embodying the cooling-gas distribution as shown in FIG. 2 in a gas-cooled machine emerges from the tubing system of FIG. 4 for the developed half circumference of the machine. Here the zones I, II and III correspond to those of FIG. 2.

The supply and removal of the cooling gas takes place in the cavity between the laminated stator body 13 and the housing 14 via tubes or the cavity between the tubes. The tubes themselves are mounted in partitions 21 to 25 in the manner as is usual in the case of tube plates. The first partition 21 separates the intake cavity 18 of the main fan 1 from the winding head cavity 2. The partition 22 separates the winding head cavity 2 from the outer hot-gas chamber 19L. The partition 23 separates the outer hot-gas chamber 19 from the cold gas chamber 12 and consequently limits the zone I. The partition 24 separates the cold-gas chamber 12 from the inner hot-gas chamber 20L and consequently limits the zone II. The partition 25 is in the centre M of the machine and limits zone III. As far as possible, the direction of flow of the cooling gas is illustrated by arrows and is as follows:

From the coolers 17, the cooling gas is fed via the main fan 1 (not shown in FIG. 4) into the winding head cavity 2, is passed from there via the tubes 11 through the outer hot-gas chamber 19 and is fed into the left-hand hot-gas chamber 12L. From there, the cold cooling gas, penetrates through the cooling slits 16 radially inwards into the laminated stator body 13, absorbs heat there from the latter and from the stator winding 15, mixes with the hot rotor gas (volumetric flow 6) from the rotor and is fed via the cooling slits flowing radially outwards into the inner hot-gas chamber 20L. Then the heated cooling gas (volumetric flow 6 and 10) flows through the tubes 26R which project through both the right-hand inner hot-gas chamber 20R and also the right-hand cold-gas chamber 12R into the right-hand outer hot-gas chamber 19R and then subsequently through tubes 27R, which project through the winding head cavity 2, back to the coolers 17 at the right-hand end of the machine.

In an analogous manner, the volumetric flow 6 and 10 from the right-hand side of the machine is fed into the right-hand inner hot gas chamber 20R, then via tubes 26L into the left-hand outer hot-gas chamber 19L, where it mixes with the volumetric flow 3 and 8, and via tubes 27L back to the coolers 17 at the left-hand end of the machine.

A marked reduction of the relative temperature maximum in the center of the rod can be achieved, according to the invention by increasing the volumetric flow through zone II and by decreasing that through zone I keeping the total quantity impelled by the fan constant. This object can be achieved without substantial interference in the overall cooling-gas system in that the volumetric flow I is throttled, on the one hand, by reducing the cross-sections of the hot-gas removal channels from the zone I and, on the other hand, returning the heated cooling gases from the zone III not via the outer hot-gas chamber 19L allocated to the zone I but by a direct route to the coolers 17 at both ends of the machine.

Figures 5A, 5B:
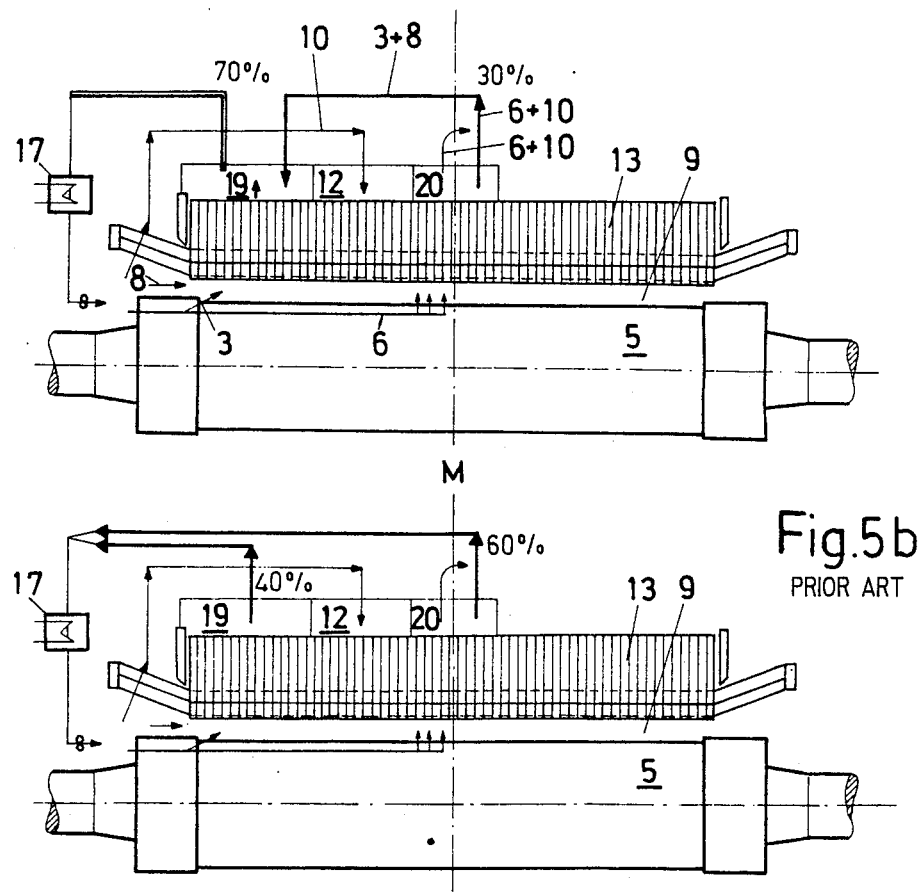
FIG. 5a shows a diagrammatic representation of the volumetric flow partition and cooling-gas distribution of the system according to the invention.
FIG. 5b shows a diagrammatic representation according to the system of FIG. 5a for the known system.

This is illustrated in FIG. 5a in which the improved partitioning of the volumetric flow is compared with the old volumetric flow partitioning (FIG. 5b). Owing to the now larger quantity of gas which is fed to the zone III via the zone II and, optionally, additionally via the air gap 9, the effective mixing temperature of the cooling gas at the entrance to the zone III after mixing with the hot rotor gas in this region reaches lower values, as a result of which the desired improvement in the cooling of the stator rods is guaranteed. This increase in the partial volumetric flows in the zones II and III of, for example, 30 to 60%, is established automatically by means of a throttling of the volumetric flow through the zone I with the total quantity impelled being unchanged.

The partial volumetric flows which are established with the proposed cooling-gas distribution are entered in FIG. 5a as percentages of the total volumetric flow and are in the exemplary case 40% for the volumetric flow 3 and 8 and 60% for the volumetric flow 6 and 10.

Figure 6:
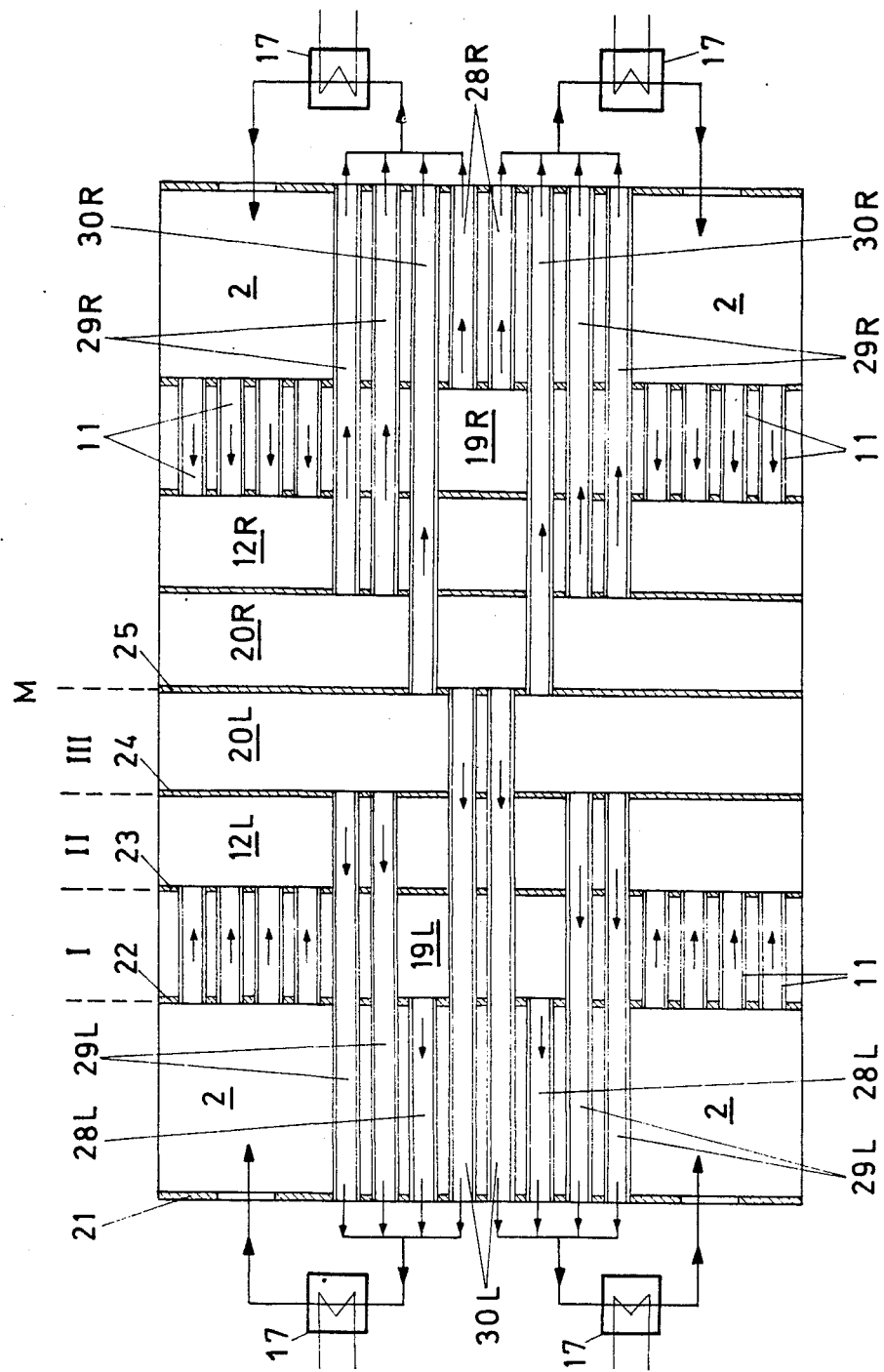
FIG. 6 an exemplary embodiment of a tubing in the space between laminated stator body and housing jacket for achieving the cooling-gas distribution according to the invention, FIG. 7 a modification of the cooling-gas distribution as in FIG. 5b with associated tubing system for ensuring emergency operation if a cooler breaks down.

If one compares the cooling gas distribution according to the state of the art and the associated tubing system as shown in FIG. 4 with the cooling-gas distribution according to the invention, whose tubing system is reproduced diagrammatically in FIG. 6, it is very clearly evident that very few constructional measures are required to implement the volumetric flow partitioning according to the invention. In this case it is only necessary to modify the cooling-gas distribution in the yoke region of the generator in a manner such that the gas flows from zone I and III are not mixed in the hot-gas chamber 19 in order to be fed together from that point to the coolers 17, but both partial volumetric flows must be removed separately both from zone I and also from zone III. In FIG. 5a this procedure is sketched and the corresponding tubing system is shown in FIG. 6 for the developed half circumference of the machine. Here the construction corresponds substantially to that as was described in connection with FIG. 4 and parts identical to those in FIG. 4 are provided with the same reference symbols. It is clearly evident that now only two tubes 28L are provided on the half circumference of the machine and for each half for removing the gas flow from the hot-gas chamber 19L, as a result of which the desired throttling action is produced without difficulty, while there is a direct flow to the ends of the machine and from there to the coolers of heated cooling gas from the central hot-gas chamber 20L via four tubes 29L for each half of the machine and of cooling gas from the central hot-gas chamber 20R of the other half of the machine via two further tubes 30L.

Figure 7:
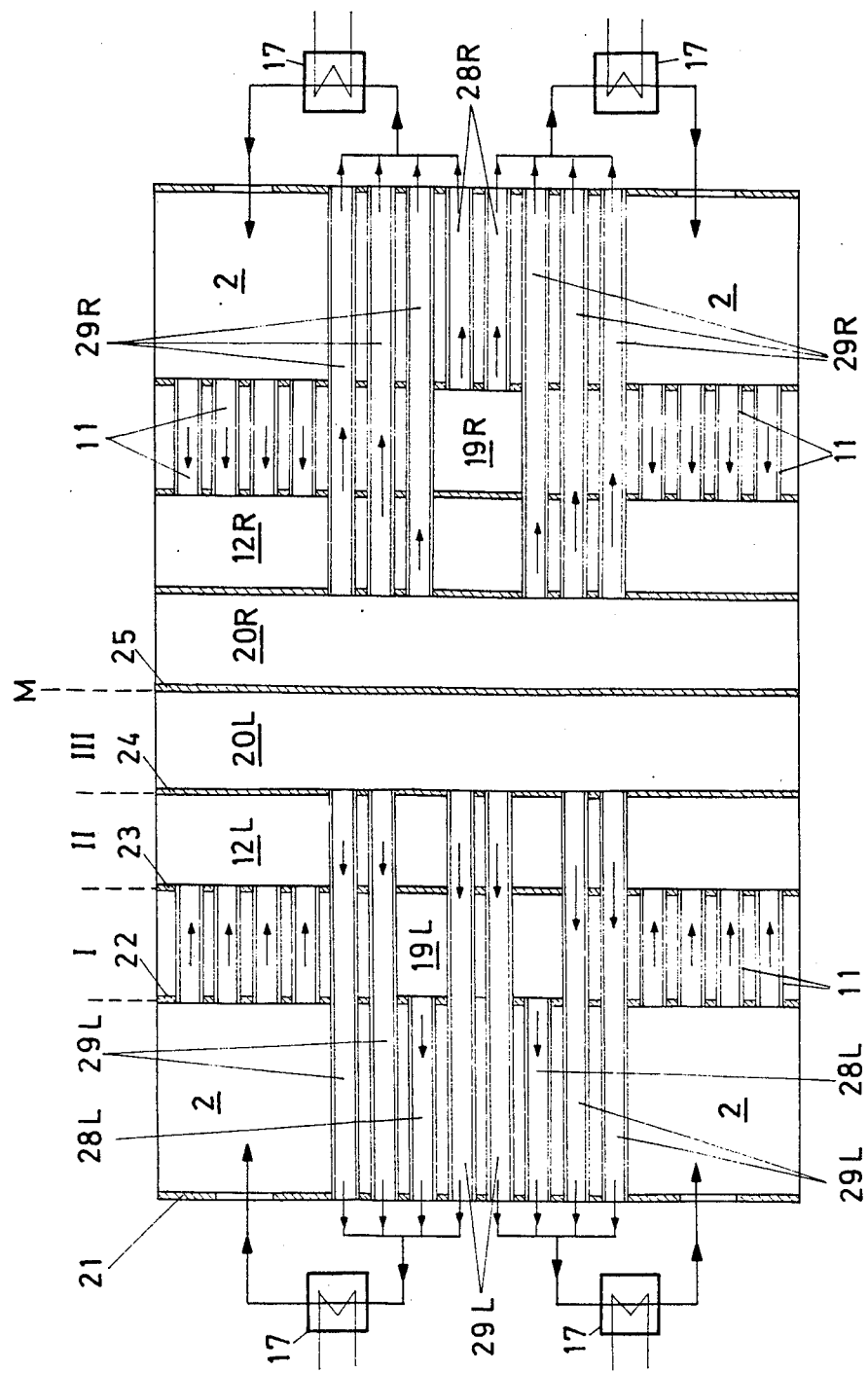

FIG. 7 illustrates a tubing system which differs from that shown in FIG. 6 only in that a genuine separation of the gas circuits has been implemented for each half of the machine in the centre M of the machine and all the tubes 29L of one half and 29R of the other half of the machine lead to the collection cavities allocated to the latter at the end of the machine and from there to the coolers 17.

Without departing from the scope of the invention, the partitioning of the volumetric flow according to the invention may also be used in gas-cooled machines with more than three zones by allotting the maximum number of tubes available to the individual hot-gas and cold-gas chambers in a manner such that the partitioning of the volumetric flow in the individual zones becomes ideal.

A further possibility of finely adjusting the volumetric flows is furthermore to dimension the (axial) width of the radial cooling slits 16 in the individual zones differently, for example by providing narrower cooling slits in the zone I and/or II than in the zone III and/or different axial lengths of the laminated subassemblies in the different zones I, II and III.

I claim:
1. An electric machine comprising:
   a housing, a rotor, and a stator having a laminated body disposed in said housing, said stator having indirectly cooled stator winding conductors disposed in grooves on an inside circumference of said stator;
   the laminated body of said stator comprising stacks of laminations grouped in packages of laminations separated at intervals to define radial ducts;
   the radical ducts forming radially extending cooling slits, said cooling slits connecting annular air-gap cavities located at the inside circumference of said laminated stator body to chambers which are situated between an outside circumference of the laminated stator body and the housing;
   said chambers comprising cold-gas chambers from which cold cooling gas is forced into associated first air gap cavitites of said laminated stator body and hot gas chambers into which heated cooling gas flows from second air gap cavities of said laminated stator body in a radially outward direction, one of said hot gas chambers being located at one end of said machine, another of said hot gas chambers being located at a central section of said machine;

cooling means which supply the cooling gas being located at least at one end of said machine, said cooling means supplying cooling gas as cold gas to the cold-gas chambers and extracting heated cooling gas from the hot gas chambers, said supply of cooling gas being cooled by at least one of said cooling means;

wherein cooling gas lines connect said hot-gas chambers to said cooling means, said hot-gas chamber located at the central section of the machine having at least one separate cooling gas line which circumvents said hot-gas chamber located at one end of the machine and said cold gas chambers and establishes a direct connection between said hot-gas chamber located at the central section of the machine and the cooler, each of said cold gas chambers being connected by additional cooling gas lines to a discharge area of one of said cooling means located at one end of said machine, said additional cooling gas lines passing through said warm gas chamber located at one end of the machine.

2. Electric machine as claimed in claim 1, wherein the hot-gas and cold-gas chambers are formed by radially extending partitions which are disposed in a cavity between the outside circumference of the laminated stator body and the housing, the cooling-gas lines being formed by tubes of various length.

3. Electric machine as claimed in claim 2, wherein the partitions separate said hot-gas chamber located at one end of the machine, one of said cold-gas chambers adjacent thereto and said hot-gas chamber located at the central section of the machine, cooling gas being fed to the hot-gas chamber located at one end of the machine through the cooling slits from the air gap of the machine radially outwards, and being fed from said one of said cold-gas chambers through the cooling-slits radially inwards to the air gap of the machine and after deflection through said cooling slits radially outwards again into the hot-gas chamber located at the central section of the machine.

4. Electric machine as claimed in claim 3, wherein said cooling means comprises impelling means and with a specified impellant power of said impelling means, a volumetric flow through the hot-gas chamber located at the central section of the machine is adjusted by dimensioning the tubes so that their cross-section is more than 50% of a volumetric flow impelled by said impelling means.

5. Electric machine as claimed in one of claims 1, 2, 3 or 4, wherein the distribution of the volumetric flow produced by said impelling means can be set by varying an axial width of the cooling slits in a manner such that the slit width in a section of the laminated stator body at the end is less than in a central section of the laminated stator body.

6. Electric machine as claimed in claim 5, wherein the distribution of the volumetric flow produced by said impelling means can be set by a variable axial width of the laminated subassemblies of the laminated stator body and by a variable axial width of the cooling slits in a manner such that the width of the laminated subassemblies in the section at the end is less than in the central section of the laminated stator body and their mutual spacing in the section at the end is less than in the central section of the laminated stator body.

7. Electric machine as claimed in claim 7, wherein at least two of said cooling gas lines which connect the hot-gas chambers to the cooling means have different cross-sections to promote an increased gas flow to the cooling gas line having a larger cross-section.

* * * * *